United States Patent [19]

DeCoster

[11] Patent Number: 5,082,135
[45] Date of Patent: Jan. 21, 1992

[54] CONTAINER FOR STORING AND DISPENSING GOODS

[75] Inventor: Pieter K. J. DeCoster, Aalst, Belgium

[73] Assignee: Dart Industries Inc., Deerfield, Ill.

[21] Appl. No.: 520,562

[22] Filed: May 8, 1990

[51] Int. Cl.$^5$ ............................................. B65D 25/10
[52] U.S. Cl. ................................... 220/93; 220/410; 220/94 A; 215/100 R; 206/804
[58] Field of Search ............ 206/217, 804; 220/85 D, 220/93, 94 A, 529, 544, 410; 215/100

[56] References Cited

U.S. PATENT DOCUMENTS

| | | |
|---|---|---|
| D. 257,201 | 10/1980 | Croyle et al. |
| 646,135 | 3/1900 | Smith .................... 220/93 |
| 2,334,595 | 11/1943 | Bailey . |
| 2,699,780 | 1/1955 | Rudnick et al. ............ 220/93 |
| 2,904,205 | 9/1959 | Callery . |
| 2,983,369 | 5/1961 | Rogovin ................ 206/804 |
| 3,040,897 | 6/1962 | Holman . |
| 3,237,549 | 3/1966 | Pospischil ............... 220/410 |
| 3,249,250 | 5/1966 | McKee . |
| 3,380,592 | 4/1968 | Arnold . |
| 3,416,689 | 12/1968 | Greenfield ............... 215/100 R |
| 4,179,040 | 12/1979 | Bateman et al. . |

FOREIGN PATENT DOCUMENTS 785603  5/1968  Canada ......................... 220/93

*Primary Examiner*—David T. Fidei
*Attorney, Agent, or Firm*—John A. Doninger

[57] ABSTRACT

A receptacle is provided with vertically extending internal guide ribs which terminate in upper support shoulders in downwardly spaced relation to the open upper end of the receptacle. An insert is mounted for vertical sliding within the receptacle and includes a bottom tray having recesses at peripherally spaced points thereabout corresponding to the position of the guide ribs. The recesses complement the ribs for a vertical non-rotational guiding of the insert. The tray, above the shoulders rotates to seat on the shoulders.

10 Claims, 2 Drawing Sheets

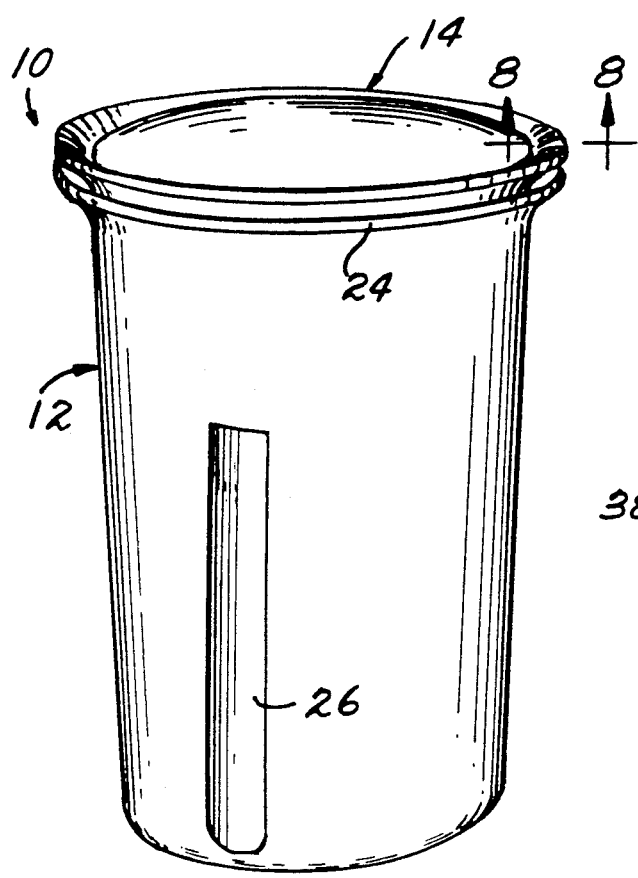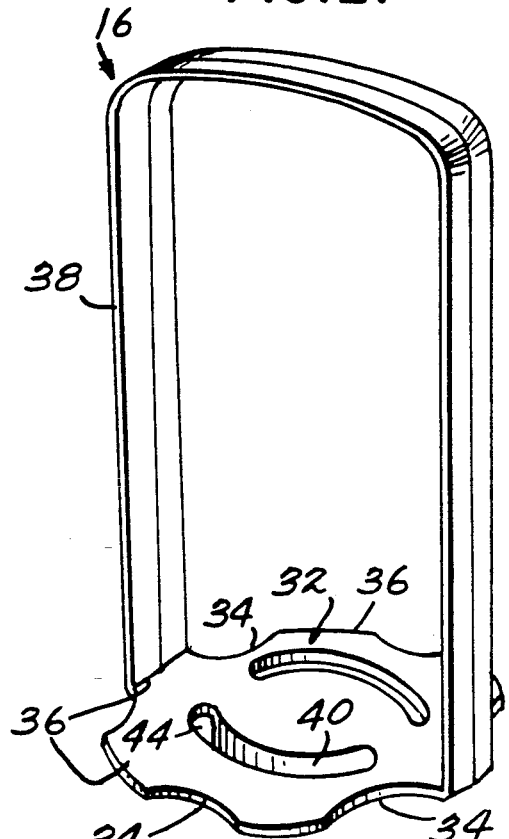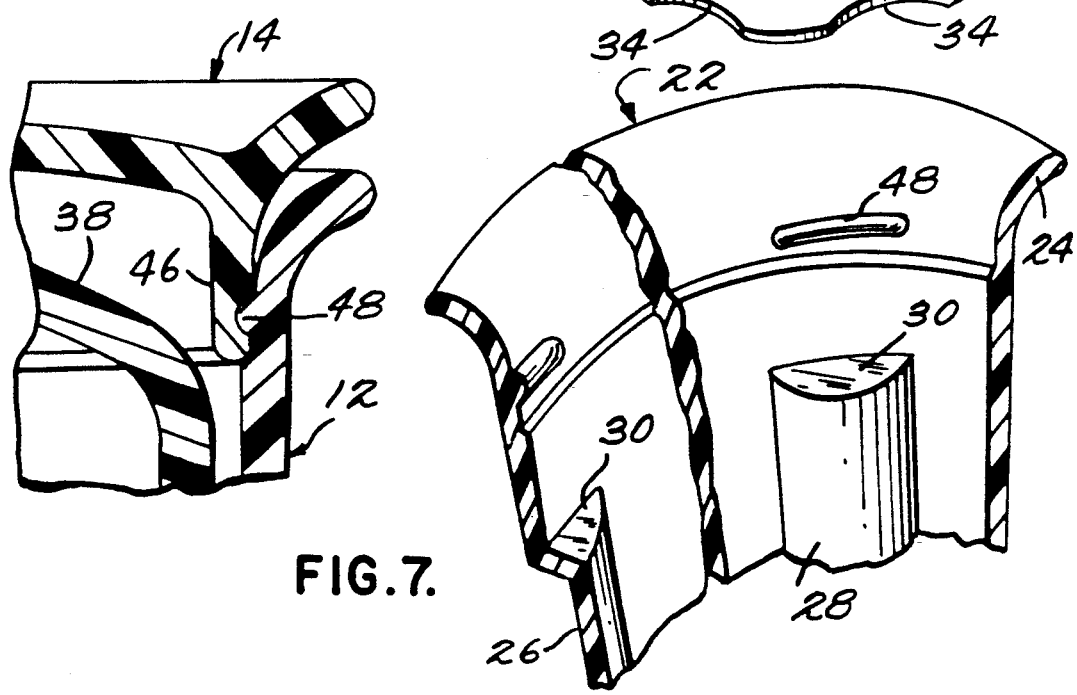

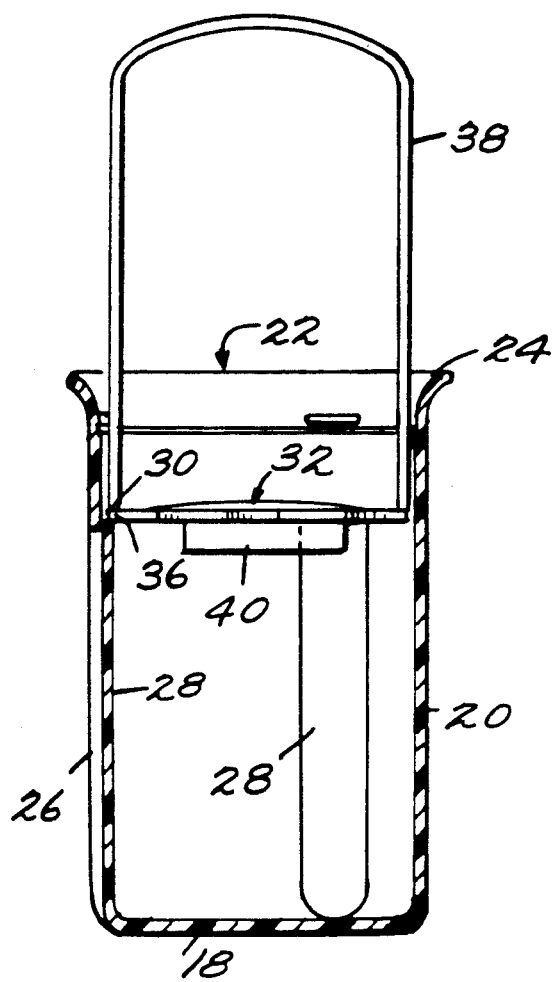
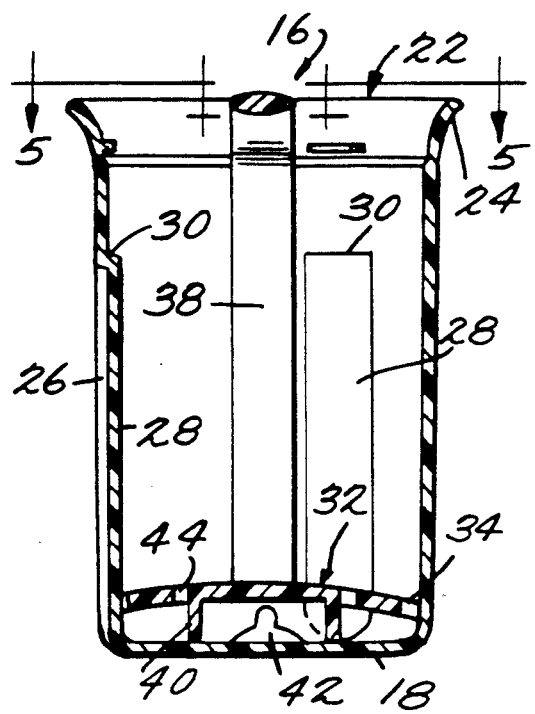
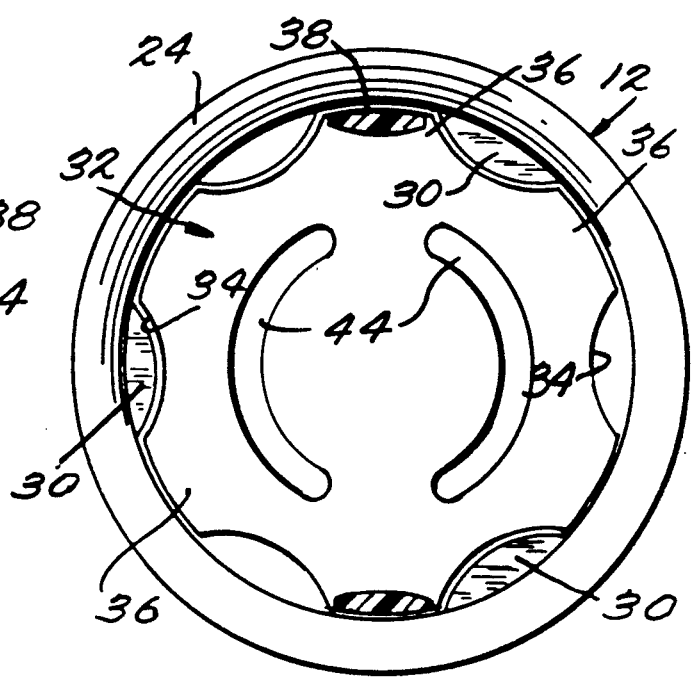
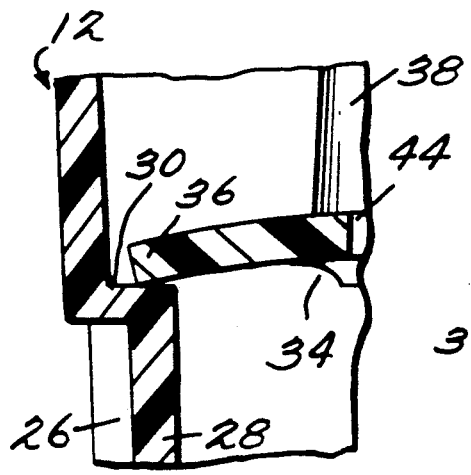

CONTAINER FOR STORING AND DISPENSING GOODS

BACKGROUND OF THE INVENTION

Selected goods, and in particular foodstuffs such as pickles and the like, are stored in containers which by their very nature give rise to difficulties in accessing and dispensing the goods.

For example, pickles are normally packed in a container submerged in brine or another appropriate liquid. Access to the pickles is provided through the top of the container and involves a gripping of the upper end of the individual pickles, either manually or utilizing an instrument such as a fork. In either case, and particularly when the container is fully packed, a withdrawal of the individual pickles can be difficult. Similarly, even in a partially empty container, one encounters the problem of "fishing" the pickle out of the brine.

A common solution to the dispensing of foodstuffs from deep liquid-containers has been to provide a vertically movable insert within the container which elevates the foodstuffs to the open upper mouth of the container. Examples of such devices will be noted in the following patents:

| | |
|---|---|
| 2,904,205 | Callery |
| 3,249,250 | McKee |
| 3,380,592 | Arnold |
| 4,179,040 | Bateman et al |

In Bateman et al, the insert has a handle which cooperates with guide means within the container to maintain proper alignment of the tray as the insert is moved. The handle projects above the container for ready access thereto.

The inserts disclosed in the remaining patents have handles at or below the top of the container and probably require removal of some of the foodstuff, as suggested in McKee, before convenient access can be had to the handle. McKee also includes a sliding lock which is indicated as being slidable along the stem of the lifting device and hooking over the upper rim of the container to hold the device at any desired location. The patent does not explain how the lock is accommodated within the container when not actually engaged with the rim.

SUMMARY OF THE INVENTION

The container of the present invention, while having general utility as a means for storing and dispensing a variety of goods, is specifically adapted for the packaging and dispensing of foodstuffs which must be stored in a liquid. In accord therewith, the container provides for a specific and fixed dispensing position wherein the contents are elevated from the stored position submerged within a liquid and exposed for direct and free access thereto.

Basically, the goods are moved between a predetermined stored position within a receptacle and a fixed dispensing position by means of an insert which includes a vertically movable support tray within the receptacle manipulated by an upwardly projecting handle of sufficient height to extend to the upper end of the receptacle and sufficiently above the contents for easy access to the handle.

The receptacle includes vertically extending guide ribs integrally formed at equally spaced points thereabout. Each rib terminates at its upper end in a flat shoulder at a height equal to approximately ⅝ to ¾ of the height of the receptacle.

The insert, and in particular the tray thereof, includes peripheral recesses which conform to the receptacle ribs for vertical guidance therealong and stabilization of the tray as the insert is vertically moved. Upon an elevation of the tray to the level of the shoulders, a slight rotation of the tray will enable a seating of the tray in a fixed supported position on the shoulders at a height at which the tray-supported contents of the receptacle are substantially completely withdrawn from the preservative liquid and exposed for convenient access thereto. The goods, until physically removed, will be retained by the height of the receptacle above the shoulders. The ribs and shoulders thus combine to provide for both a guiding function and a supporting function for the insert.

It is preferred that the tray be provided with twice as many edge recesses as receptacle ribs for a reduction in the rotation of the tray required to move the tray between the supported and guiding positions relative to the vertical ribs. The tray itself is also specifically configured, through a slight doming thereof, and the provision of arcuate drainage slots, for a free discharge of liquid therethrough as the insert is raised. The insert includes a stand integral with and depending centrally from the tray to maintain the tray slightly away from the bottom of the receptacle and thus provide a sufficient degree of clearance to avoid any movement-restricting engagement of the tray with the bottom, particularly about the edges thereof.

Additional features and advantages of the invention will be noted from the more detailed description of the invention following hereinafter.

BRIEF DESCRIPTION OF THE DRAWINGS

FIG. 1 is a perspective view of the container of the invention;

FIG. 2 is a perspective view of the insert;

FIG. 3 is a vertical cross-section through the container with the closure removed and with the insert at its lowermost position in the receptacle;

FIG. 4 is a sectional view similar to FIG. 3 with the insert in its elevated position;

FIG. 5 is an enlarged top plan view taken on a plane passing along line 5—5 in FIG. 3;

FIG. 6 is an enlarged detail illustrating a tray lug seated on a support shoulder;

FIG. 7 is a perspective detail of the interior upper portion of the receptacle; and FIG. 8 is an enlarged cross-sectional detail taken substantially on line 8—8 in FIG. 1.

DESCRIPTION OF THE PREFERRED EMBODIMENT

Referring now more specifically to the drawings, the container 10 consists of a receptacle 12, a closure 14 and an insert 16.

The receptacle 12 includes a substantially planar bottom 18, a peripheral wall 20 integral with the periphery of the bottom 18 and extending vertically upward therefrom, and an open top 22 defined by the outwardly flared upper edge 24 of the wall 20. The peripheral wall 20 is cylindrical with the receptacle having a circular cross-section which is constant for the effective height of the wall for vertical sliding manipulation of the insert 16 as shall be described subsequently.

The peripheral wall 20, at three equally spaced points about the exterior thereof, is provided with inward depressions 26 along vertical extents from the bottom 18 to a height equal to approximately ⅔ to ¾ of the height of the receptacle 12. These vertical deformations or depressions 26 define vertical ribs 28 within the interior of the receptacle which present smooth constant cross-sections, preferably arcuate as illustrated, from the bottom to planar shoulders 30 which extend horizontally into the interior of the receptacle 12 approximately ¼ to ⅓ of the height below the open top 22 thereof. The ribs 28 function as guides for the insert 16, and the shoulders 30 function as supports for an elevated insert, all as shall be discussed presently.

The insert 16 includes a bottom support tray 32 slightly upwardly convex and having an outer periphery generally circular and configured to conform to the interior of the receptacle.

The periphery of the tray 32 is provided with a series of recesses 34 thereabout, arcuate in the illustrated embodiment, configured to conform to the inwardly projecting ribs 28 of the receptacle 12. The ribs 28 and the recesses 34 form guide means that allow both free sliding and guided movement of the tray vertically within the receptacle. The tray 32, peripherally between adjacent recesses 34, is provided with full diameter or projecting lugs 36 which, when positioned to the opposite sides of a recessed-received rib, preclude rotational shifting of the tray during its vertical travel along ribs 28.

Vertical movement of the tray 32 is effected by a handle 38, preferably a bail fixed to and extending upward from opposed lugs 36 and of a height generally coextensive with the open top 22 of the receptacle 12 when the insert 16 is fully seated therein. The crossbar of the handle 38 and the interior of the overlying closure 14 will be configured to provide for both a maximum height projection of the handle and a complete enclosure thereof by the closure.

An integral cylindrical wall 40 depends centrally from the tray 32 below the plane of the outer periphery of the tray 32 and defines a stand for support of the fully inserted tray 32 slightly above the bottom 18 of the receptacle 12 to avoid any tendency of the tray 32 to jam against or within the bottom corners of the receptacle interior. The cylindrical wall 40 is provided with a pair of opposed substantially full height notches 42 therein which prevent formation of an air cushion or air pocket which might affect free movement of the insert 16.

The insert 16 is completed by the provision of elongate arcuate slots 44 through the tray 32 along and immediately outward of opposed sides of the cylindrical wall 40 to allow for an enhanced drainage of liquid as the insert is elevated with the foodstuff supported on the tray 32.

In use, the insert 16 will normally support elongate foodstuffs such as pickles, pickle spears, or the like, within a preservative liquid. Upon an elevation of the insert, the foodstuff, or at least a major portion thereof, is vertically withdrawn from the liquid and positioned for easy access thereto. The insert 16 is elevated to a point wherein the tray 32 is located immediately above the rib shoulders 30. The insert 16 is then rotated to position selected lugs 36 over the adjacent shoulders 30 for seated support thereon. The foodstuff, without further handling of the insert, is now positioned for ready availability and dispensing directly from the storage receptacle and without either the difficulty normally encountered in attempting to remove pickles from jars, or the necessity for elevating the insert each time a pickle is to be extracted.

The positioning of the shoulders 30, and hence the supported tray 32, at a position approximately ¼ to ⅓ of the height of the receptacle below the open top, exposes a substantial portion of the contents while also providing for a positive peripheral containing thereof against accidental discharge from the receptacle.

While three recesses 34 can be provided to correspond to the three internal ribs 28 of the receptacle 12, it is preferred that six equally spaced recesses 34 be defined within the periphery of the tray 32. In this manner, a reduced turning of the insert will be required to align the recesses 34 with the ribs 28 when inwardly moving the insert from the upper supported position thereof. Also, the additional recesses will provide for a more effective draining of liquid through the tray, the slightly upwardly bowed configuration of the tray ensuring a complete drainage of the liquid from the upper surface thereof.

The closure 14, which can be of any appropriate configuration, will overlie the flanged upper end 24 of the receptacle wall 20 and preferably include a depending interior skirt 46 releasably snap-engaged to the interior of the upper portion of the receptacle by appropriate detent means 48. The interior of the closure 14 is configured to accommodate the upper end of the handle 38 of the insert 16.

The container is to be formed of appropriate materials compatible to the contents to be stored and dispensed. For example, with foodstuffs, a synthetic resinous material such as a polycarbonate or a polypropylene may be used.

As desired, the receptacle 12 can be transparent or opaque. If opaque, the depressed portions 26, which define the internal ribs 28, may be formed as transparent for a selective viewing of the contents of the container.

The foregoing is considered illustrative of the principles of the invention. As variations and modifications, within the parameters of the invention may occur to those skilled in art, it is not desired to limit the invention to the exact construction and manner of use specifically described.

I claim:

1. A combined storage and dispensing container for goods comprising a receptacle including a vertically extending cylindrical wall, a closed bottom and an open top, said peripheral wall and bottom defining a receptacle interior, an insert vertically slidable within said receptacle interior, said insert including a tray and handle means affixed to and extending vertically from said tray, said tray, in response to vertical sliding of said insert, being movable between said bottom and said open top, shoulder means on said wall inwardly directed into said receptacle interior and in vertically spaced relation above said bottom and approximately ¼ to ⅓ of the height of said receptacle below said open top, guide ribs on said wall and projecting into the interior of said receptacle, said ribs extending vertically from the bottom of said receptacle and terminating in upper ends defining said shoulder means, said tray including recesses therein receiving said ribs for guided movement of the tray vertically along the ribs, said tray being selectively movable between a first stored position received on and supported by said bottom, and a second dispensing position received on and supported by said shoulder means in vertically spaced relation above said bottom and in vertically spaced relation substantially below said open top with said cylindrical wall extending vertically above said tray and defining a substantially constant cross-section for said receptacle interior from said tray to said open top for containment of tray-supported goods, said tray, above said shoulder means and within said cylindrical wall, being rotatable relative to said receptacle for supporting engagement of said tray on said shoulder means.

2. The container of claim 1 wherein said guide ribs comprise three identical vertically extending and equally spaced ribs provided about the interior of the receptacle for a three-point support of said tray, said tray having at least three recesses defined therein and spaced to simultaneously receive the three ribs.

3. The container of claim 2 wherein six recesses are defined in said tray and equally spaced about the edge thereof for simultaneous reception of the three ribs in alternate recesses.

4. The container of claim 3 wherein said tray is upwardly convex and includes a pair of arcuate drainage slots therethrough in inwardly spaced relation to said tray edge.

5. The container of claim 4 wherein said tray includes a stand integrally formed therewith and depending centrally therefrom, said stand being in inwardly spaced relation to said tray edge and depending below said tray edge.

6. A combined storage and dispensing container comprising a receptacle including a vertically extending peripheral wall, a closed bottom and an open top, said peripheral wall and bottom defining a receptacle interior, an insert vertically slidable within said receptacle interior, said insert including a tray and handle means affixed to and extending vertically from said tray, said tray, in response to vertical sliding of said insert, being movable between said bottom and said open top, shoulder means on said wall inwardly directed into said receptacle interior and in vertically spaced relation above said bottom for selectively receiving and supporting said tray thereon in vertically spaced relation above said bottom, guide means between said bottom and said shoulder means for stabilizing said tray and for guiding said tray during movement of said tray from said bottom to said shoulder means, said tray, above said shoulder means, being adjustable relative to said receptacle for supporting engagement of said tray on said shoulder means, said guide means comprises three vertically extending ribs on said wall equally spaced thereabout and projecting into the interior of said receptacle, said tray having a peripheral edge generally conforming to the interior of the receptacle, six recesses defined in said tray and equally spaced about the edge thereof for simultaneous reception of the three ribs in alternate recesses to preclude rotation of said tray and provide guided movement thereof along the vertical extent of said ribs, said ribs terminating in upper ends defining said shoulder means, said tray to each side of each of said recesses defining lugs extended beyond said recesses and engageable on said shoulder means upon rotation of said tray above said shoulder means, said receptacle interior being substantially cylindrical, said tray being upwardly convex and including a pair of arcuate drainage slots therethrough in inwardly spaced relation to the tray edge, said tray including a stand integrally formed therewith and depending centrally therefrom, said stand being in inwardly spaced relation to the tray edge and depending below said tray edge, said stand including a depending peripheral wall with passage means defined laterally therethrough.

7. The container of claim 6 wherein said handle means is joined to and extends vertically from a pair of opposed lugs.

8. The container of claim 7 including a closure for selectively closing said open top of the receptacle, and means for releasably securing said closure to said receptacle.

9. The container of claim 1 wherein said open top is outwardly flared.

10. A combined storage and dispensing container for goods comprising a receptacle including a vertically extending peripheral wall, a closed bottom and an open top, said peripheral wall and bottom defining a receptacle interior, an insert vertically slidable within said receptacle interior, said insert including a tray and handle means affixed to and extending vertically from said tray, said tray, in response to vertical sliding of said insert, being movable between said bottom and said open top, shoulder means on said wall inwardly directed into said receptacle interior and in vertically spaced relation above said bottom and below said open top, and guide means between said bottom and said shoulder means for stabilizing said tray and for guiding said tray during movement of said tray from said bottom to said shoulder means, said guide means comprising at least one vertically extending rib on said wall and projecting into the interior of said receptacle, said tray having a peripheral edge generally conforming to said interior of said receptacle, and at least one recess defined int he edge of said tray and receiving said rib therein to preclude rotation of said tray and provide guided movement thereof along the vertical extent of said rib, said tray being selectively movable between a first stored position received on and supported by said bottom, and a second dispensing position received on and supported by said shoulder means in vertically spaced relation above said bottom and in vertically spaced relation below said open top with said peripheral wall extending vertically above said tray and presenting a constant cross-section from said tray to said open top for containment of tray-supported goods, said tray, above said shoulder means and within said peripheral wall, being adjustable relative to said receptacle for supporting engagement of said tray on said shoulder means, said tray including a stand integrally formed therewith and depending centrally therefrom, said stand being in inwardly spaced relation to the tray edge and depending below said tray edge, said stand including a depending peripheral wall with passage means defined laterally therethrough.

* * * * *